_UNITED STATES PATENT OFFICE._

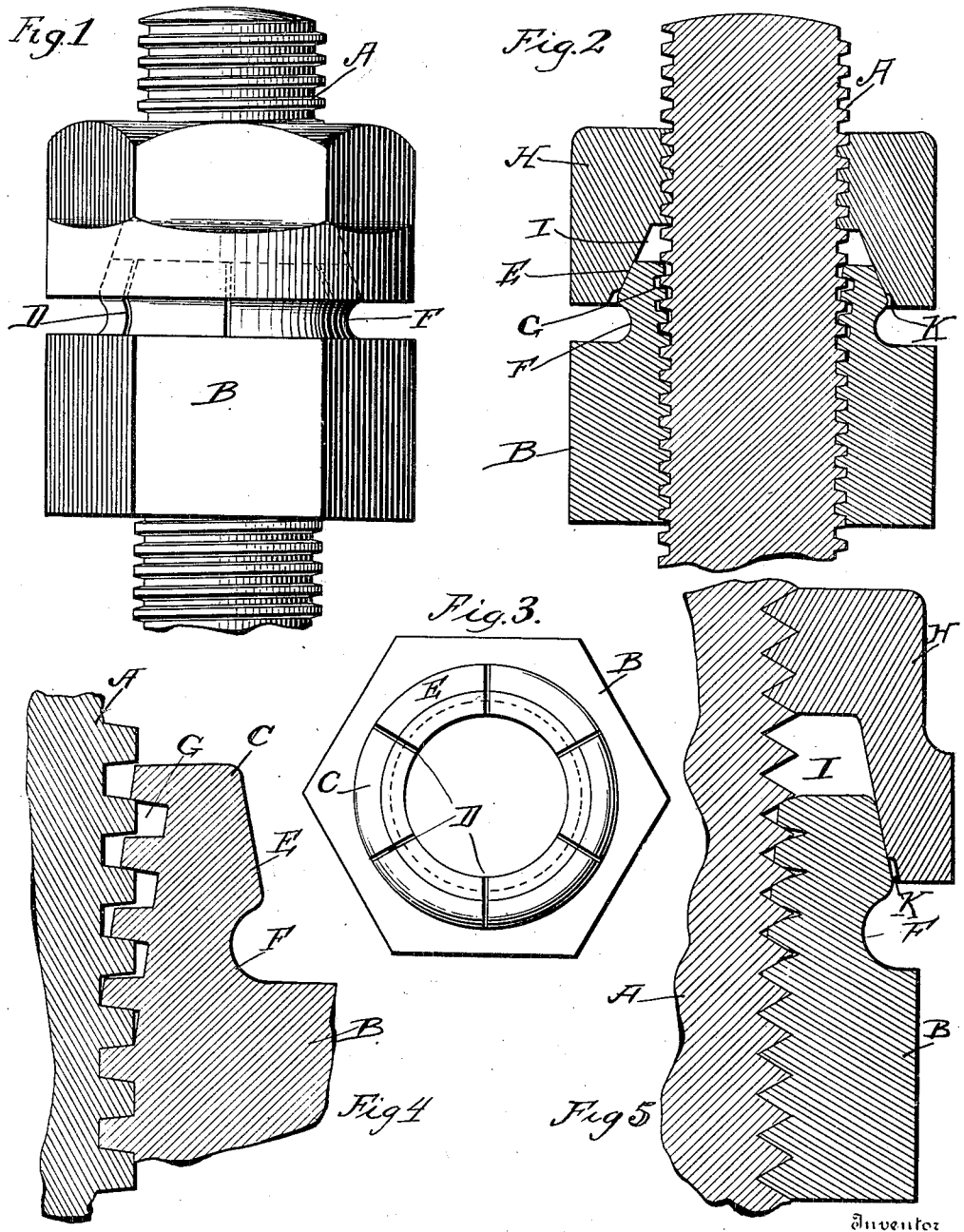

JOHN SCHMITT, OF BROOKLYN, NEW YORK.

NUT-LOCK.

No. 812,299.  Specification of Letters Patent.  Patented Feb. 13, 1906.

Application filed July 5, 1904. Serial No. 215,318.

_To all whom it may concern:_

Be it known that I, JOHN SCHMITT, a subject of the German Emperor, residing at Brooklyn, in the county of Kings and State of New York, have invented a new and useful Improvement in Nut-Locks, of which the following is a specification.

This invention relates generally to nut-locks, and more particularly to that class thereof known as "top" and "thread" nut-locks.

The object of the invention is to provide an exceedingly simple and highly efficient construction of nut-lock which can be quickly and easily applied and when once in use will not work loose.

Another object of the invention is to provide a nut-lock in which neither the bolt, the working nut, nor the locking-nut is weakened; and a still further object is to provide a nut-lock which utilizes the frictional force of the wedge for effecting the lock between the nut and bolt and also between the working nut and the lock-nut.

With these objects in view the invention consists in the novel features of construction hereinafter fully described, and pointed out in the claim.

In the drawings forming a part of this specification, Figure 1 is a side elevation of a nut-lock constructed in accordance with my invention. Fig. 2 is a vertical section of the same. Fig. 3 is a top plan view of the working nut. Figs. 4 and 5 are enlarged detail sections showing different styles of thread.

Referring to the drawings, A indicates the threaded bolt or rod, upon which the working nut B is screwed, said nut having an annular boss C upon the top side thereof, said annular boss being split radially, as shown at D. The outer face of the annular boss is inclined or beveled, as shown at E, and at the bottom an annular groove or chamfer F is cut for the purpose of rendering the annular boss elastic. The inner face of the boss is provided with threads of a size similar to the thread of the nut, and these threads are, in fact, a continuation of the threads of the nut, but are provided with square points forming biting edges. The annular boss, however, is slightly flared or spread, so that it is of a slightly greater diameter than the bore of the nut, as most clearly shown in Fig. 4. The threads of the annular boss, however, are intended to be wedged into the threads of the bolt, and in order to accomplish this I employ a lock-nut H, which is screwed upon the bolt and which has a conical-shaped recess I in the lower face thereof, the inclined walls being adapted to contact with the inclined or beveled exterior of the annular boss C, and as the lock-nut H is firmly screwed down the threads G of the annular boss are wedged into the threads of the bolt. The lower edges of the inclined walls of the locking-nut are cut away, as shown at K, in order to avoid friction at that point and relieve the strain from the outer edge of the lock-nut. It will also be noted that the lower portion of the lock-nut is round in shape, whereas the upper portion is hexagonal in shape, the lower portion being round in order to strengthen the nut at the point where the strain is greater. The locking-nut being firmly screwed down upon the working nut with its threaded boss the threads of said boss will not only be wedged into the threads of the bolt, but the locking-nut will be securely wedged upon the said boss, thereby providing an absolutely tight nut-lock. It will thus be seen that I provide a nut-lock in which neither the bolt nor the nuts are weakened and one in which the powerful force of the wedge is utilized for locking the parts together.

Having thus fully described my invention, what I claim as new, and desire to secure by Letters Patent, is—

A nut-lock, comprising a working nut, provided with an annular boss, upon one face, said boss being provided with threads having square biting edges, said boss being radially slotted and beveled and flared outwardly, in combination with a lock-nut having a conical-shaped recess in its lower face, the lower edges of the inclined walls of which are cut away, said recess adapted to engage the beveled face of the annular boss, for the purpose of wedging the biting edges of the boss, into the threads of the bolt.

JOHN SCHMITT.

Witnesses:
AUGUST DANNEMANN,
CHARLES A. OHR.